United States Patent [19]
Bezos et al.

[11] Patent Number: 5,166,610
[45] Date of Patent: Nov. 24, 1992

[54] DUAL RANGE SPEED INDICATOR WITH ACCELERATION DISPLAY

[75] Inventors: Angel P. Bezos, Rockville; Donald M. Crisafulli, Silver Spring, both of Md.

[73] Assignee: Pulse Electronics, Inc., Rockville, Md.

[21] Appl. No.: 742,177

[22] Filed: Aug. 2, 1991

Related U.S. Application Data

[63] Continuation of Ser. No. 591,714, Oct. 2, 1990, abandoned.

[51] Int. Cl.[5] .............. G01R 1/08; G01P 3/42; G01P 15/00; B60Q 1/54
[52] U.S. Cl. .................. 324/160; 73/488; 73/511; 246/191; 324/96; 324/114; 324/115; 324/122; 324/156; 324/162; 340/588; 340/754
[58] Field of Search ......... 324/96, 99 D, 114–116, 324/122, 156, 157, 160, 162, 166, 171; 116/334; 73/431, 488–495, 499, 511, 514, 516 R, 517 R, 517 A; 377/112, 113; 340/466, 467, 670, 715, 722, 753, 754, 762; 364/565; 246/6, 47, 55, 62, 191, 473 R

[56] References Cited

U.S. PATENT DOCUMENTS

| | | | |
|---|---|---|---|
| 3,619,574 | 11/1971 | Mindheim | 324/96 X |
| 4,199,758 | 4/1980 | Wilhelm et al. | 340/753 |
| 4,243,985 | 1/1981 | Quayle | 324/122 X |

OTHER PUBLICATIONS

Product Description; Brocksopp Engineering; BE-4C 0-80, Dual Range Speedometer; Feb. 9, 1990.

*Primary Examiner*—Gerard R. Strecker
*Attorney, Agent, or Firm*—Whitham & Marhoefer

[57] ABSTRACT

A solid state speed indicator for railroad locomotives is provided with a plurality of indications in addition to speed. These include an acceleration indicator and an overspeed indicator. In addition, the speed indicator is provided with a dual range speed function having at least one particular use in drag operations. A variation of the solid state speed indicator is a retrofit design that replaces the meter movement in existing speed indicator equipment with a solid state display.

15 Claims, 9 Drawing Sheets

DUAL RANGE SPEED INDICATOR WITH ACCELERATION DISPLAY

This application is a continuation of application Ser. No. 591,714 filed Oct. 2, 1990, now abandoned.

BACKGROUND OF THE INVENTION

1. Field of the Invention

The present invention generally relates to speed indicators for vehicles and, more particularly, to an improved solid state speed indicator for railroad locomotives.

2. Description of the Prior Art

Speed indicators for railroad locomotives typically have been analog devices having a dial and a rotating indicator which points to indicia printed on the dial to provide a visual indication and measurement of speed. Current speed indicators are electrically driven, employing a meter movement. An example of this type of speed indicator is the Pulse Model SI80-XX-W Speed Indicator manufactured by Pulse Electronics of Rockville, Md. This speed indicator employs an axle driven speed sensor which generates a signal having a frequency proportional to speed. This signal is processed to produce a pulse rate signal that is supplied to the speed indicator circuitry. The speed indicator circuitry performs several functions. First, the circuitry generates a current signal proportional to speed that is used to drive the meter movement. Second, the circuitry includes overspeed detection circuits which can be preset or adjusted to a desired speed. The overspeed detection circuits include a comparator which, when an overspeed condition is detected, causes a visual indicator to be activated and deactivates a signal line connected to an external brake valve. Third, the circuitry includes calibration circuits which allows the speed indicator to be calibrated for wheel diameter.

The prior speed indicators have gained wide acceptance in the industry; however, their functions are limited and reliability is primarily determined by the ruggedness of the meter movement. It is therefore generally desirable to replace or retrofit the prior electro-mechanical speed indicators with solid state displays. By using solid state circuitry, it is also possible to provide additional functions not available on the prior speed indicators. For example, U.S. Pat. No. 4,862,433 to Bezos et al. describes a timer circuit for drag operation of trains wherein gondolas are loaded by slowly dragging a train consist past a loading chute. During such an operation, train speed is typically in the range of one third to three and one half miles per hour, a range that barely registers on the prior speed indicators.

SUMMARY OF THE INVENTION

It is therefore an object of the present invention to provide a solid state speed indicator for railroad locomotives.

It is another object of the invention to provide a dual range speed indicator for railroad locomotives having particular use in drag operations.

It is a further object of the invention to provide a speed indicator for railroad locomotives which provides an acceleration indicator.

It is a further object of the invention to provide the improved speed indicator display for retrofit in existing speed indicator equipment.

According to the invention, there is provided a digital display simulating an analog dial. The display is in the form of a first plurality of indicia arranged in an arc. These indicia represent increments of speed and, in the preferred embodiment, are implemented with light emitting diodes (LEDs). Normally, these LEDs represent one mile per hour increments. As speed increases, the LEDs in the arc are successively energized, thus presenting the display of an increasing arc. A second plurality of indicia, also arranged in an arc but of smaller radius than the first arc, represent multiples of the increments of speed. In the preferred embodiment, these second indicia are also implemented with LEDs, but these LEDs, which may represent increments of five miles per hour, are always illuminated to provide a display of cardinal points on the speed indicator display.

Adjacent to at least some of the indicia of the second plurality are decimal numerals in multiples of ten. Each of the digits of these decimal numerals are back lighted by individual planar LEDs which are selectively energized depending on the speed range to be indicated. The dual range feature is implemented by selectively energizing the units digit of the numerals. Thus, for a speed indicator having a normal range of 0 to 80 mph, by turning off the LEDs back lighting the units digit, the speed indicator displays a "drag" range of 0 to 8 mph, providing the engineer with a very precise indication of speed during a "drag" operation.

Acceleration is also provided in a numerical display in miles per hour per minute. Alternatively or in addition to the numerical display, two arrows are located at a convenient place within the arcs of the two pluralities of indicia. This might be, for example, in the approximate center of the display. The two arrows respectively point up and down and are back lighted by respective planar LEDs. With no change in velocity, i.e., zero acceleration, neither arrow is lighted. If the train is decelerating, then the arrow pointing down is lighted, but if the train is accelerating, the arrow pointing up is lighted. An additional LED intermediate the two arrows may be provided to indicate no acceleration or constant speed.

The overspeed indicator provided in the prior electro-mechanical speed indicator is implemented in one embodiment by means of an LED that flashes a warning of imminent overspeed when the speed of the locomotive is within a predetermined range, say five miles per hour, lower than a set maximum speed and then is held on when that maximum speed is equaled or exceeded. Alternatively, the overspeed indicator can be implemented by providing a dual function to another display function of the speed indicator. As a specific example, the speed indicator is provided with an odometer counting feet to five digits, each digit being displayed by a seven segment LED. When an over speed condition is detected, the five seven segment LEDs can be caused to provide an alpha display such as "OSP" or other suitable message to the engineer. As before, this message could be flashed within a predetermined speed range lower than the over speed setting and held on when the over speed condition is equaled or exceeded.

The preferred embodiment of a complete replacement solid state speed indicator according to the invention is implemented with a microprocessor which computes the various displayed functions. However, there is a large installed base of the prior electro-mechanical speed indicators and it is desirable to provide only a retrofit display component which will allow these speed indicators to be upgraded to a solid state display while protecting the rather substantial investment that these speed indicators represent. To that end, the invention also contemplates the provision of a replacement door assembly for the prior electro-mechanical speed indicators. The meter movement of the electro-mechanical speed indicators is mounted in a hinged door which allows access to the circuitry within the speed indicator housing. This door assembly is replaced with a new door assembly which takes signals from the existing circuitry and processes those signals with additional circuitry to provide a solid state display having similar functionality as that of the replacement solid state speed indicator according to the preferred embodiment of the invention. A feature of the circuitry of the retrofit is a unique way of controlling the brightness of the many LEDs which make up the display. This retrofit, however, does not include a microprocessor so that some of the functions, such as a numerical display of acceleration, provided by the microprocessor version are not available in this retrofit unit. The retrofit unit was designed to be an economical alternative to complete replacement of the electro-mechanical speed indicators with the more full-featured microprocessor-based solid state speed indicator.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENTS OF THE INVENTION

Figure 1:
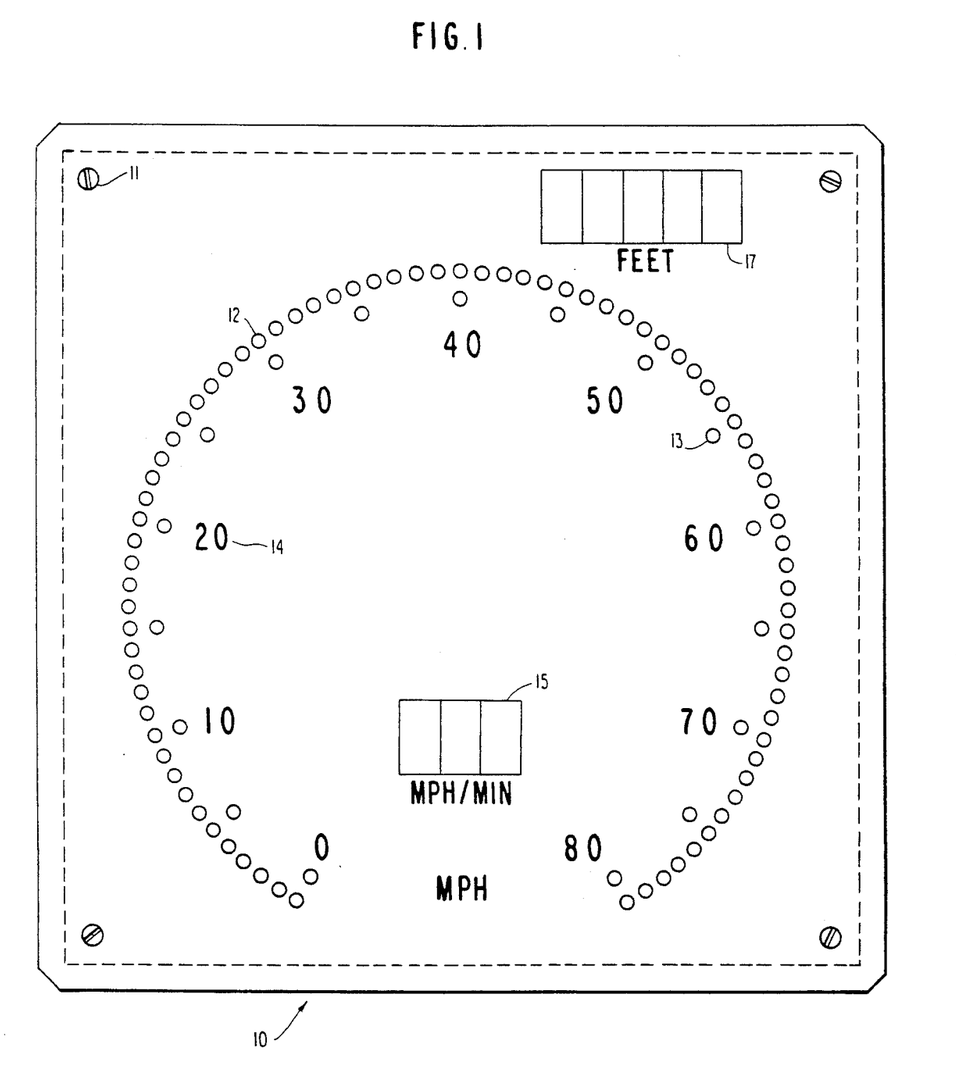
FIG. 1 is a plan view of the face of the display for the solid state speed indicator according to the invention.

Referring now to the drawings, and more particularly to FIG. 1, there is shown the face 10 of the solid state speed indicator according to a preferred embodiment of the invention. The face 10 is screw mounted to a housing (not shown) by screws 11 at each of its four corners and serves as a closure to the housing. A first plurality of LEDs 12 are arranged in an arc generally centrally located on the face 10. In the embodiment shown, there are 81 LEDs indicating increments of one mile per hour from zero to eighty miles per hour. The first or zero mile per hour LED is always on, and as speed increases, successive LEDs are lighted, presenting an increasing lighted arc to the engineer and simulating the moving indicator of prior analog speed indicators. A second plurality of LEDs 13 are arranged in an arc having a smaller radius but on a common center with the first arc of LEDs. In the preferred embodiment shown, there are 17 of these LEDs at five mile per hour increments. The LEDs 13 are always lighted and represent cardinal points on the speed indicator. At zero and ten mile per hour increments are decimal numerals 14 from zero to eighty. The decimal numerals are formed by etching or otherwise forming the numerals in a mask on the back surface of the face 10 so that the places where the numerals are formed are transparent. As will be described in more detail, each of these decimal numerals are back lighted by planar LEDs so that, like the LEDs 13, cardinal points of the display are always lighted, but here with numerals at increments of ten miles per hour. The dual range feature of the preferred embodiment of the invention is implemented by selectively illuminating the zero numerals in the ten to eighty decimal numeral displays. The first zero is always illuminated, but by turning off the LEDs back lighting the other zeros, the display functions as a speed indicator for the range of zero to eight miles per hour. When displaying in this range, the speed indicator cooperates with the timer circuit for drag operation described in the above mentioned U.S. Pat. No. 4,862,433.

The speed indicator as thus far described provides a rugged and more functional display than the prior meter driven movement. Moreover, since the solid state speed indicator is immune to vibration, it provides a more accurate display of speed in a railroad locomotive than does the meter driven movement. The preferred embodiment being described is microprocessor driven and, therefore, even greater functionality is provided than was heretofore possible. Specifically, an acceleration display 15 is provided. This display comprises three numerical seven-segment LED devices to provide the engineer with a quantitative indication of acceleration from 0 to ±199 miles per hour per minute. Deceleration is indicated by a minus sign in the hundreds' position of the display. This quantitative display is useful information for the engineer in controlling the locomotive. As will be described with reference to the preferred embodiment of the retrofit display version, arrows indicating acceleration or deceleration are provided to replace the numerical display in this version.

In the upper right hand corner of the speed indicator face 10 is an odometer display 17. This display comprises five numerical seven-segment LED devices to provide the engineer with a quantitative indication of distance traveled in feet. This display is useful to the engineer in a depot or loading operation, allowing precise positioning of cars in the consist adjacent a loading dock, for example. Like the numerical acceleration display, the odometer display is driven by the microprocessor, which calculates distance traveled in feet for a preset wheel diameter, when this function is activated by the engineer.

As mentioned, the prior analog speed indicator provides an indication of overspeed. This function has been implemented in the preferred embodiment of the solid state speed indicator, as well. This is done by using the odometer display 17. This display is normally blanked at speed; therefore, it is available for providing an overspeed warning to the engineer. By using the seven-segment devices to display alpha characters, a suitable warning can be provided. For example, the alpha display "OSP" can be displayed on the LEDs which comprise the odometer display 17. If, for example, seventy miles per hour and above represents an overspeed condition, then at sixty-five miles per hour, the alpha display "OSP" can be displayed by flashing, and this flashing display maintained until sixty-nine miles per hour. At seventy miles per hour, the alpha display "OSP" is displayed without flashing and the signal to the external brake valve is de-activated. It will of course be understood that the overspeed indicator could be a separate display or that an alpha display other than "OSP" could be displayed.

In the preferred embodiment of the solid state speed indicator, the circuitry is implemented on three printed circuit boards, one for the power supply, one for the microprocessor and one for the display. However, in another implementation with reduced functionality, only two boards are used. In either case, the two or three boards may be conveniently stacked within the housing to provide a very compact packaging of the speed indicator.

Figure 2:
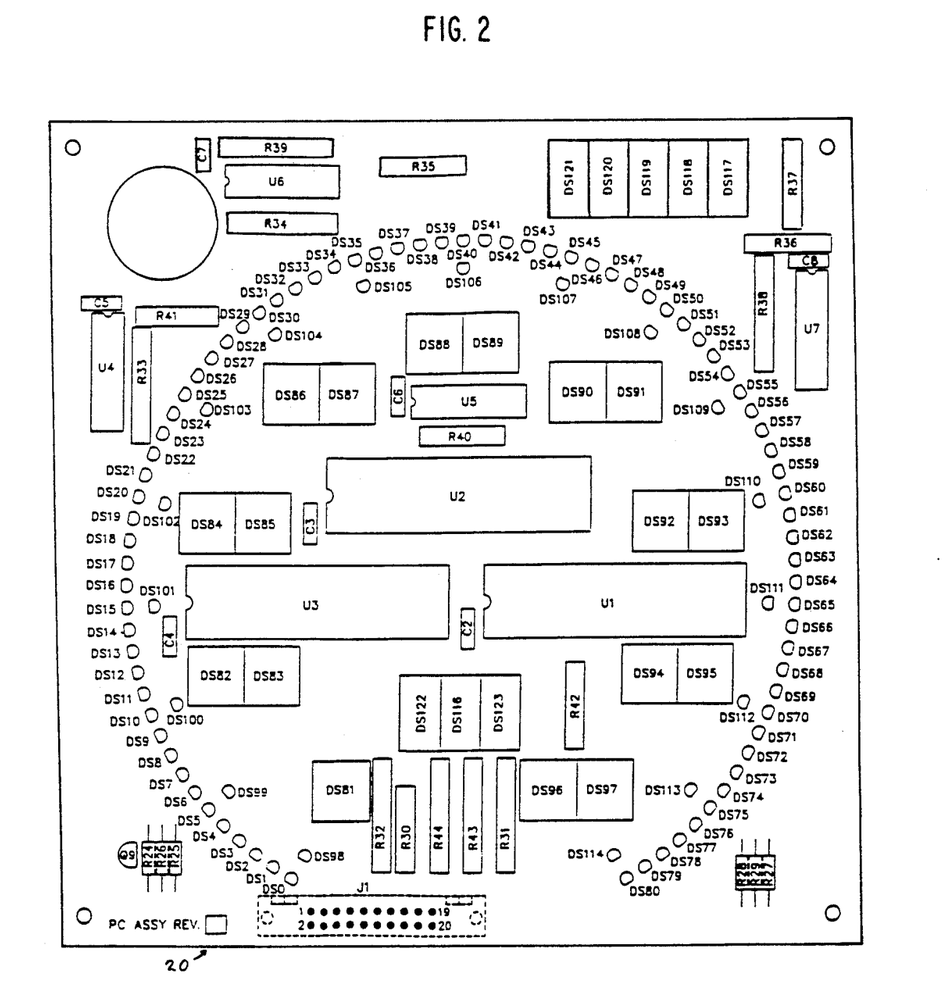
FIG. 2 is a plan view of the display printed circuit board showing the arrangement of LEDs behind the face of the display shown in FIG. 1.

The display printed circuit board 20 is illustrated in FIG. 2. Here the placement of the LEDs is evident, the diodes DS0 to DS80 being the eighty-one LEDs 12 and the diodes DS98 to DS114 being the 17 LEDs 13, shown in FIG. 1. The planar LEDs DS81 to DS97 are used to back light the numerals 14, shown in FIG. 1. Planar LEDs DS83, DS85, DS87, DS89, DS91, DS93, DS95, and DS97 illuminate the zeros for the decimal numerals ten to eighty, and these are the LEDs which are selectively energized to provide the dual range function. LED devices DS116, DS122 and 123 are seven-segment displays used for the acceleration and odometer displays. Various other circuit elements, including integrated circuits (indicated by the "U" prefix), resistors (indicated by the "R" prefix), capacitors (indicated by the "C" prefix), and transistors (indicated by the "Q" prefix) are also shown on the printed circuit board. These constitute the display driver circuitry which is controlled by the microprocessor. In addition, there is a connector J1 indicated in dotted line outline. This connector is on the reverse side of the printed circuit board and provides the connections to the microprocessor, and thereby to the power supply, printed circuit board.

Figure 3:
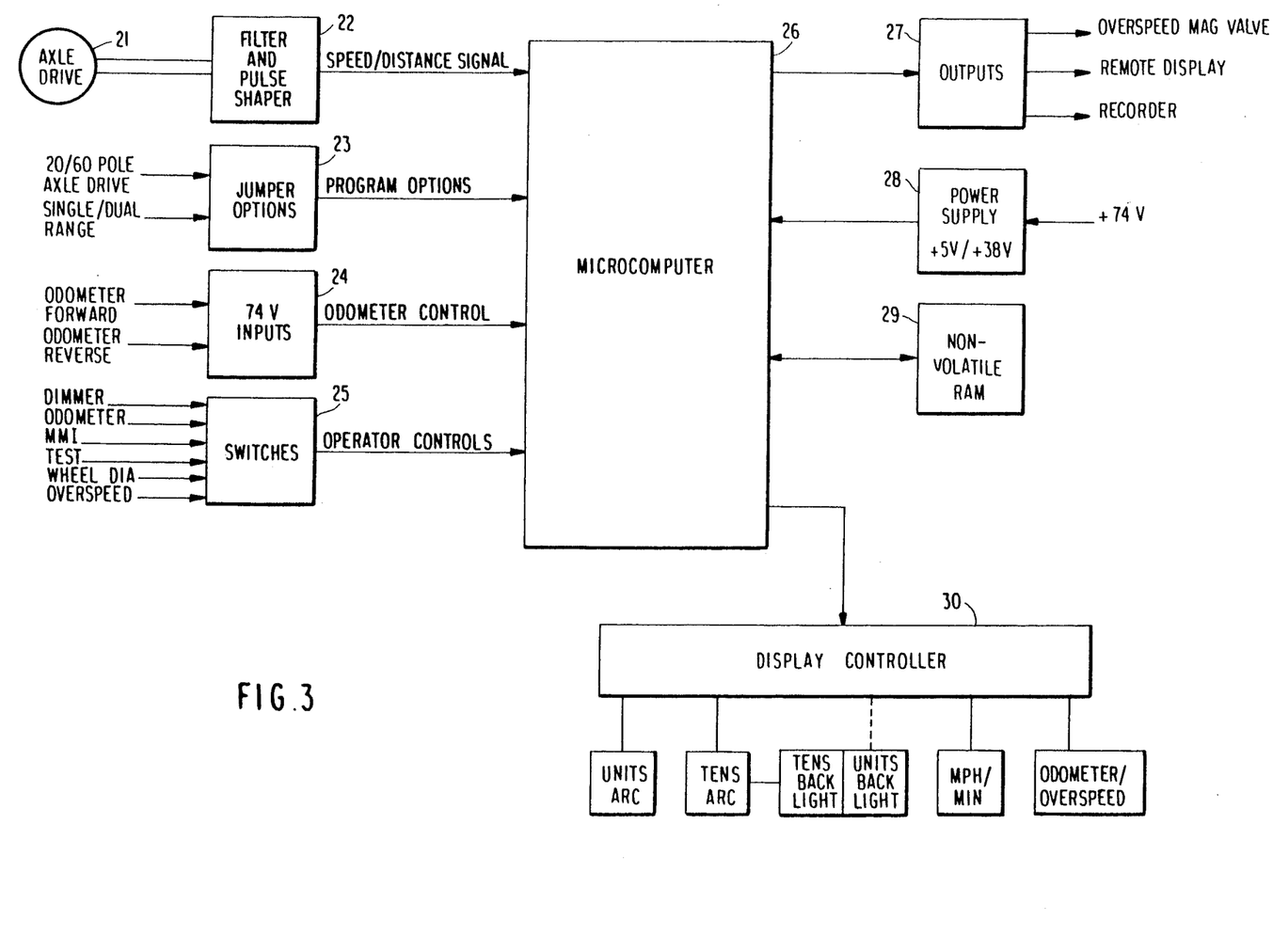
FIG. 3 is a block diagram showing the functional elements of the solid state speed indicator.

FIG. 3 is a high level block diagram of the circuitry for the solid state speed indicator. In this preferred embodiment, the solid state speed indicator uses a microcomputer 26 of conventional design based on an Intel 80C32 microprocessor, electrically programmable read only memory (EPROM), volatile random access memory (RAM), and non-volatile electrically erasable and programmable read only memory (EEPROM).

Speed sensing is performed by a generator 21, mechanically coupled to a locomotive axle, which produces a generally sinusoidal signal having a frequency proportional to speed. This signal is processed by a low pass filter and pulse shaper 22 to produce a square wave output.

The microcomputer 26 receives the following inputs: the conditioned axle signal from pulse shaper 22, jumper settings defining the type of axle generator (e.g., 20 or 60 pole) from jumper options 23, conditioned locomotive signals defining forward or reverse direction from the 74 V inputs 24, and operator control switch inputs from the switches 25 providing settings such as dimmer, overspeed, and wheel diameter. Using these inputs and the control program internally stored in EPROM, the microcomputer 26 calculates and generates all the signals needed to drive the display controller 30 and produce the correct dynamic display of speed, acceleration, odometer, and overspeed in accordance with the display presentation techniques previously described. Speed or velocity is determined by processing the conditioned axle signal from pulse shaper 22. Acceleration is computed by differentiating and properly filtering velocity, and distance is computed by counting axle events and knowing the wheel diameter setting.

Additionally, the microcomputer 26 generates external overspeed, remote display, and recorder output signals using output circuitry 27. Non-volatile memory 29 is used to retain the last-selected values of the wheel diameter, overspeed, and dimmer settings. DC operating power for the microcomputer 26, display controller 30, and other circuitry is derived from the 74 volt DC locomotive supply using power supply 28.

Figure 4:
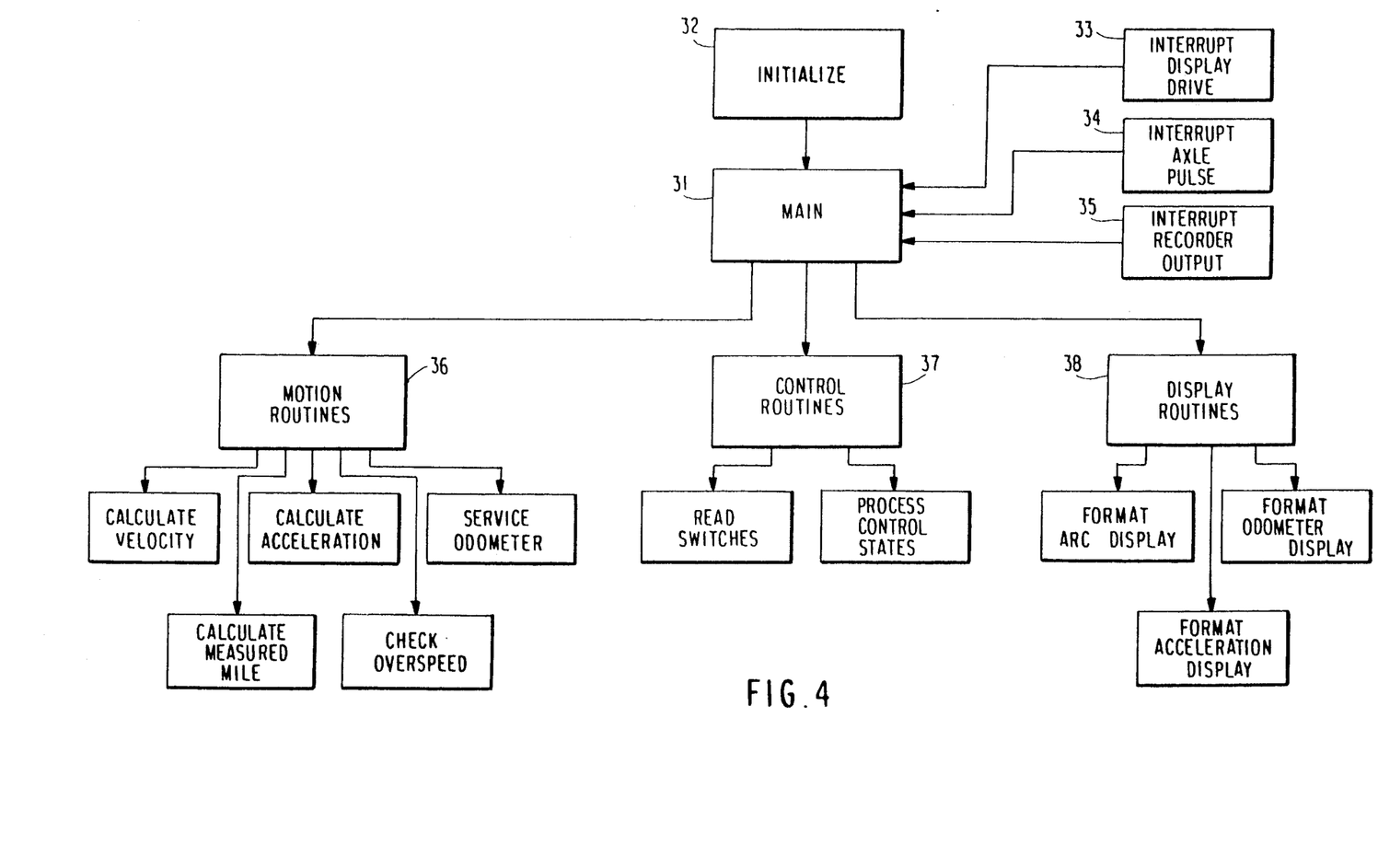
FIG. 4 is a block diagram showing the organization of the major software modules of the control program for the microcomputer shown in FIG. 3.

FIG. 4 shows the organization of the major software modules which constitute the control program stored in EPROM. The system is initially turned on, the main program 31 is initialized by an initialize routine 32 that performs a system check. Inputs to the main program 31 are via interrupts, including display drive 33, axle pulse 34 and recorder output 35 interrupts. There are three main routines called by the main program. These are the motion routines 36, the control routines 37 and the display routines 38. The modules of the motion routines 36 respectively calculate velocity, acceleration and distance, check overspeed and service the odometer. The modules of the control routines 37 read the input switches and process the control states. The modules of the display routines format the arc display, the acceleration display and the odometer display. The various routines and modules are themselves straight forward and readily implemented based on functional description of the solid state speed indicator, supra.

Figure 5:
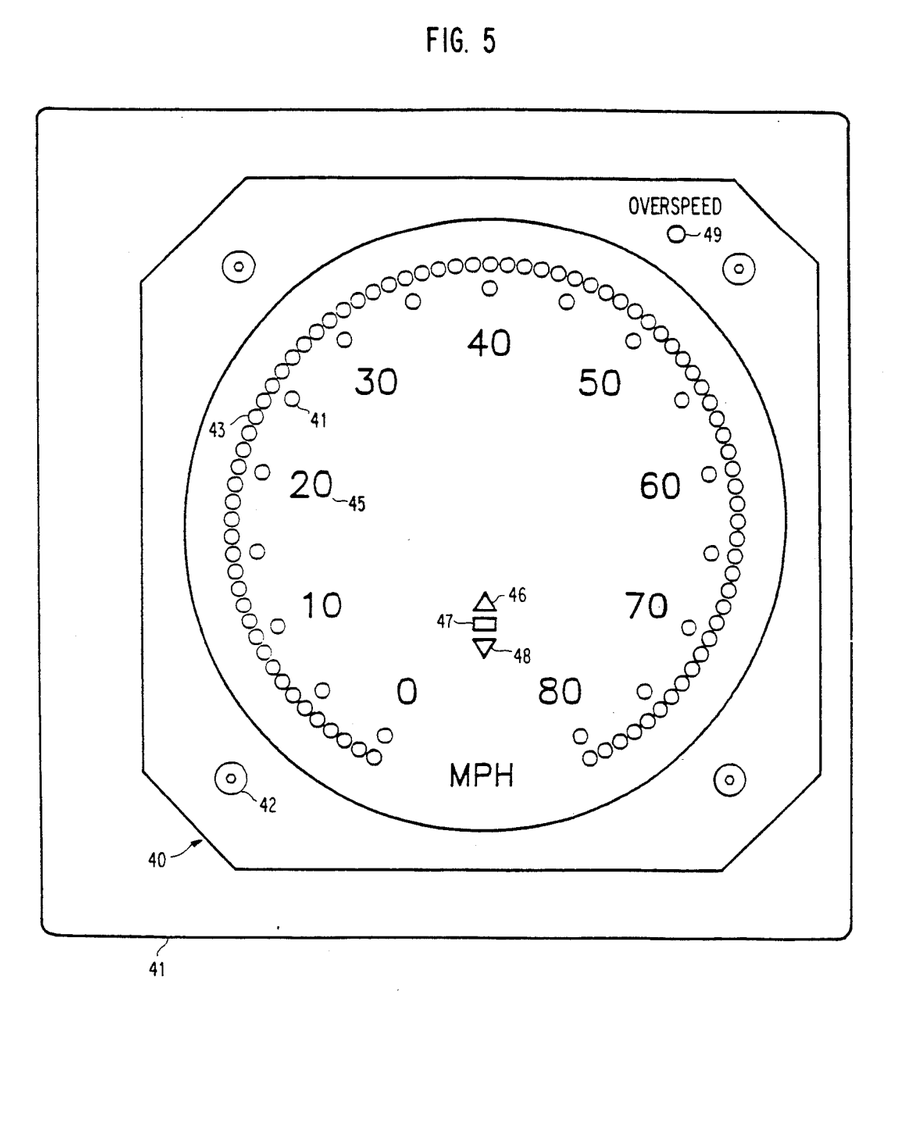
FIG. 5 is a plan view of the face of the display for the retrofit speed indicator display according to the invention.

Referring next to FIG. 5 of the drawings, there is shown the face 40 which forms a part of a retrofit display unit for the prior meter movement speed indicators. As mentioned, the meter movement is installed in a door of this prior analog speed indicator; therefore, the retrofit unit comprises a replacement door 41 in which the face 40 and its supporting circuitry is installed by means of cap screws 42. This retrofit speed indicator display face is quite similar to that shown in FIG. 1 and includes a first plurality of LEDs 43 arranged in an arc, each of these LEDs representing increments of one mile per hour. A second plurality of LEDs 44 are arranged in an arc within the first arc and, again, represent five mile per hour increments. Decimal numerals 45 from zero to eighty at ten mile per hour increments are formed in a mask on the back surface of the face 40, and these decimal numerals are back lighted by planar LEDs. The indicia described thus far perform the same functions as the indicia 12, 13 and 14 shown in FIG. 1.

It will be observed in FIG. 5 that the face of the retrofit speed indicator display 40 varies from that shown in FIG. 1 in two respects. First, instead of providing a quantitative acceleration display 15 in miles per hour per minute as in FIG. 1, the retrofit speed indicator display face 40 in FIG. 5 provides separate indicia 46, 47 and 48 in the form of an up arrow, a bar and a down arrow, respectively. In the embodiment shown, if the locomotive is accelerating, the up arrow 46 will be lighted; if the locomotive is decelerating, the down arrow 48 will be lighted; but if the locomotive is at constant velocity, the bar 47 will be lighted. Actually, in the preferred embodiment, the bar 47 is lighted as long as acceleration or deceleration is within a predetermined range, say ±2 miles per hour per minute. This serves to stabilize the display so that the arrows 46 and 48 are not alternately flashing under some conditions. Thus, the acceleration display in this retrofit indicator display is threshold-sensing and qualitative rather than a quantitative display.

The other difference between the display faces shown in FIGS. 1 and 5 is that the retrofit speed indicator display does not include an odometer. Nevertheless, the overspeed function is supported by an LED 49 in the upper right hand corner of the display face. This LED begins flashing when speed is within a predetermined limit, say five or six miles per hour, lower than a preset speed, say 70 miles per hour, with the LED lighted continuously at and above the preset speed.

Figure 6:
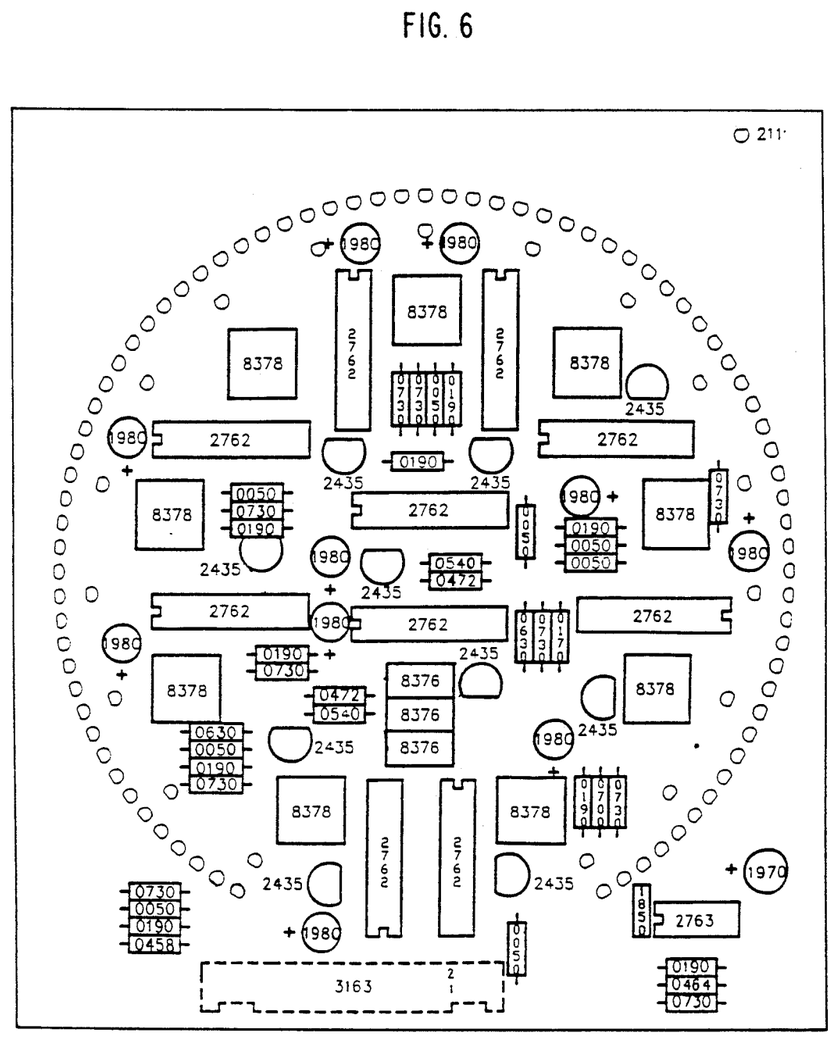
FIG. 6 is a plan view of the display printed circuit board showing the arrangement of LEDs behind the face of the retrofit display shown in FIG. 5.

FIG. 6 is similar to FIG. 2 but for the face 40 shown in FIG. 5. The planar LEDs designated as 8376 provide the back lighting for the acceleration indicia 46, 47 and 48. The LED designated 2111 in the upper right hand corner of the printed circuit board provides the overspeed indication function. It will be noted here, however, that instead of two planar LEDs for the decimal numerals, only a single planar LED, designated 8378, is provided for each of the decimal numerals. This particular model of the retrofit display does not support the dual speed function because not all customers desire or specify that function. It will be understood, however, that the retrofit display may be provided with the dual speed function just as the solid state speed indicator shown in FIGS. 1 to 4.

Figure 7:
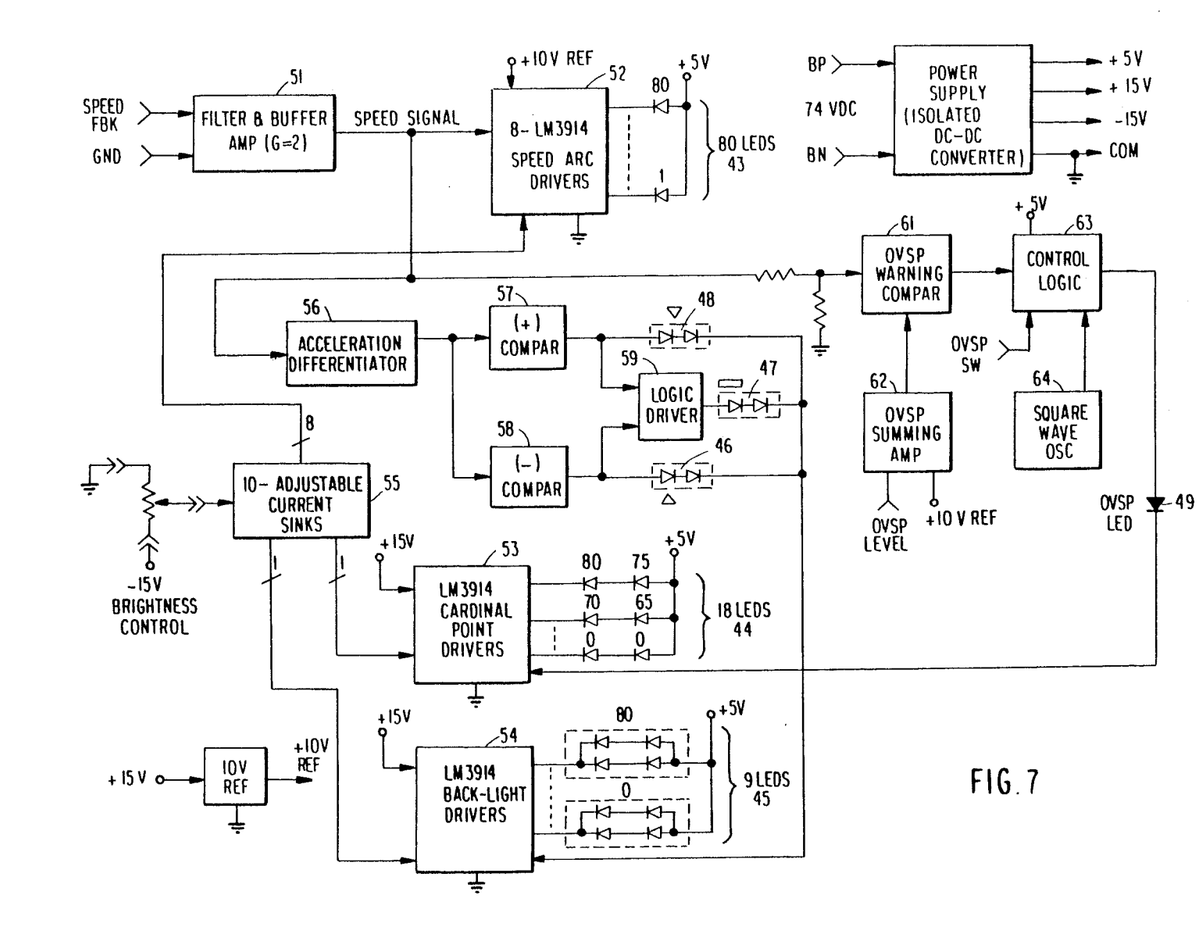
FIG. 7 is a block diagram showing the functional elements of the retrofit speed indicator display unit.

FIG. 7 is a block diagram of the additional circuitry needed to implement a solid state LED display for retrofit to an existing Pulse speed indicator. This circuitry, unlike that of FIG. 3, does not use a microcomputer. The FIG. 7 circuitry connects to the control electronics of a standard Pulse analog speed indicator by means of a nine wire cable. This cable brings in all the needed interface signals, including a voltage representation of the speed signal itself (denoted as speed feedback or fbk).

The speed signal is filtered and amplified by amplifier 51. The amplified signal is applied simultaneously to the input of eight LM3914 integrated circuit (IC) LED drivers 52 connected in series across respective taps of a precision resistive voltage divider (shown in FIG. 8) energized by a precision ten volt reference supply. The magnitude of the amplified speed signal, relative to the reference voltage, determines which of the eighty speed LEDs 43 are illuminated.

Figure 8:
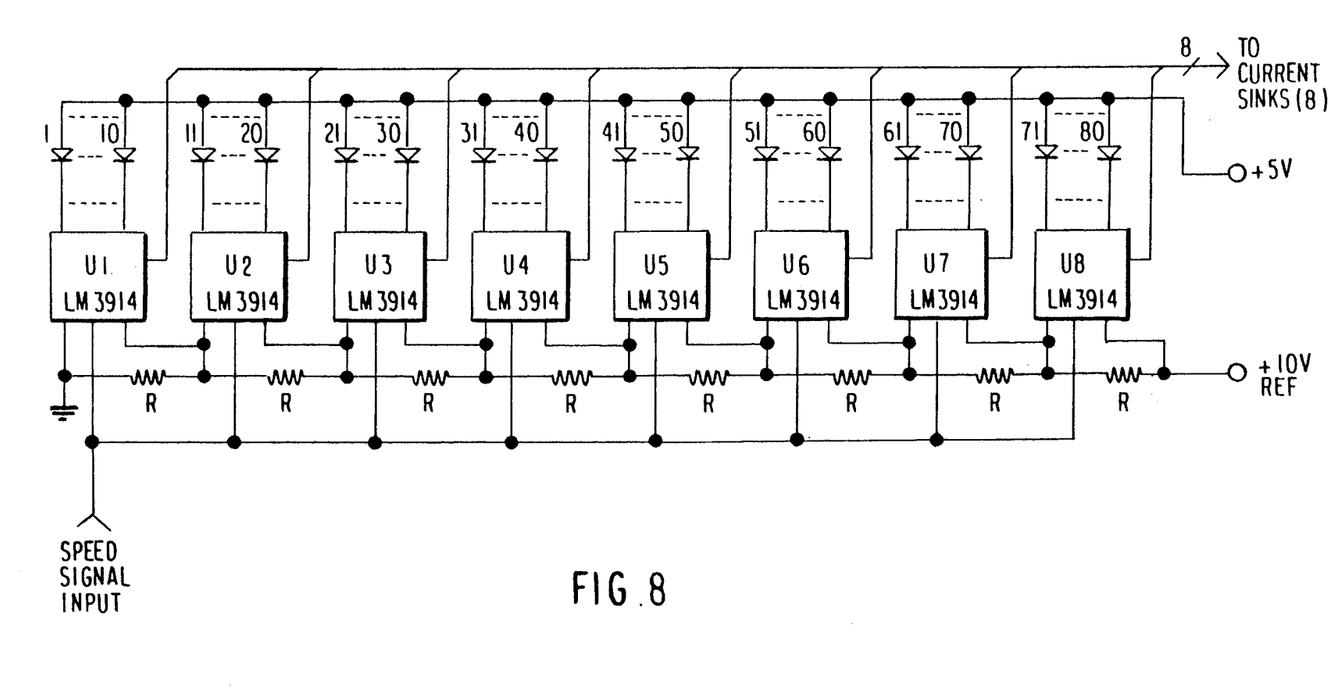
FIG. 8 is a block and schematic diagram of the basic speed display circuitry for the retrofit speed indicator display unit.

FIG. 8 shows the details of interconnecting the eights LM3914 devices. By using an external voltage divider made up of eight equal value precision (1% or better) resistors, the voltage applied to the internal voltage divider of each LM3914 is constrained to be very close to 1.250 volts. Further, the value R of each resistor in the external divider is selected low enough so that it swamps out tolerance and temperature variations in the internal LM3914 voltage divider. Since the internal voltage reference of the LM3914 devices are not used, the major error in sensing proper turn-on threshold for each speed arc LED is due to internal offset voltages within each LM3914. Consistent with other design trade-offs (such as the maximum full scale speed to be displayed, the maximum supply voltage capability of the LM3914, the precision and output current capability of available reference sources, etc.), the voltage impressed across each LM3914 should be maximized in order to minimize LM3914 offset effects.

Returning to FIG. 7, a ninth LM3914 IC 53 is DC biased to always illuminate the seventeen cardinal point LEDs 44 plus the first LED of the speed arc which represents zero miles per hour. In a similar manner, a tenth LM3914 IC 54 activates the nine planar LEDs which light the decimal numerals zero to eighty. Thus, the LEDs connected to LM3914 ICs 53 and 54 are illuminated independent of speed, thereby forming the calibration indicia for the speed indicator.

For a dual range retrofit indicator, an eleventh LM3914 LED driver would be used to separately control eight planar LEDs which selectively back light the zeros in the decimal numerals ten to eighty. In addition, a switchable range amplifier would be configured in the speed channel to amplify the speed signal by a factor of ten. Both the LED driver and the gain of ten amplifier would be switchable under the control of a signal from the drag logic, such that on the low speed range, the back light zeros are turned off and the amplifier gain is increased.

Figure 9:
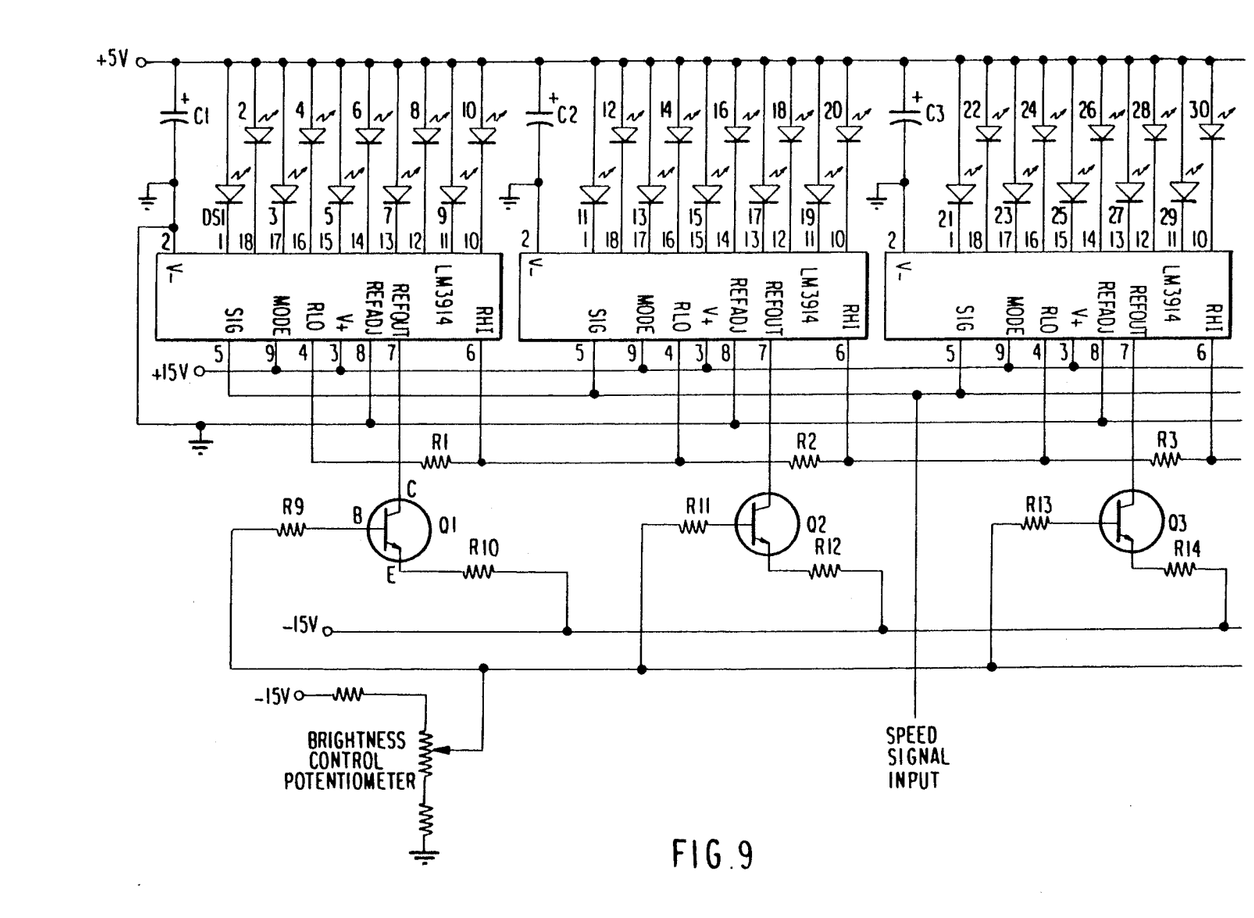
FIG. 9 is a schematic diagram of the brightness control for the LEDs of the retrofit speed indicator display unit.

An important and unique design feature of the retrofit indicator is the circuit technique used to implement simultaneous brightness control of all LED display devices. Normally, the brightness control of all LEDs controlled by any one LM3914 integrated circuit is set by a resistor connected between pins 7 and 8. Since at least ten LM3914 drivers are used in one preferred embodiment, a means was needed to individually slave the brightness control of these ten drivers to a single control device. This is accomplished by using ten current sinking transistors, generally indicated at 55 in FIG. 7, individually connected to pin 7 of each LM3914. FIG. 9 shows this connection for three of the LM3914 Ics, and it will be understood that the connections shown are typical. The base element of each current sink is connected in parallel (through a suitable isolation network) to the wiper of the brightness control potentiometer. In this way, it is possible with a single user control to adjust and maintain intensity tracking of the LED display devices over a wide brightness range.

As a circuit variation to the above, some improvement in brightness tracking and range is possible if the ten current sinking transistors individually connected to pin 7 of each LM3914 are simultaneously pulsed with a variable duty cycle signal which controls their conduction interval. The repetition frequency should be greater than a few hundred Hertz to avoid stroboscopic motion effects and to allow the persistence of the eye to integrate and average the light pulses in the LEDs connected to each LM3914 driver IC.

In this circuit variation, the brightness control potentiometer is a component of a duty cycle generator and acts to vary, under user control, the output duty cycle and thus the overall display brightness. Since the current sinking transistors in this variation are always switched either fully on or fully off, any changes in their linear characteristics with temperature are effectively eliminated.

The only computing performed by this retrofit embodiment is an analog differentiation of the amplified speed signal by the differentiator 56 to generate an acceleration signal. The acceleration signal is applied to a pair of comparators 58 and 57 which determine, respectively, whether there is net acceleration or deceleration. As mentioned, these comparators have a threshold equivalent to two miles per hour per minute so that there will be no output from either of the comparators unless acceleration or deceleration exceeds that equivalent threshold. An output from comparator 58 energizes the up arrow 46 signifying acceleration, while an output from comparator 57 energizes the down arrow 48 signifying deceleration. NAND logic 59 receives outputs from both the comparators 57 and 58, and when there is no output from either of the two comparators, logic 59 energizes the bar LED 47 signifying constant locomotive speed. Note that the actual drive current through these LEDs is controlled by the LM3914 LED driver 54 so that the brightness of the LEDs 46, 47 and 48 also track the overall display brightness.

The speed signal is also supplied to an overspeed warning comparator 61 which receives a reference voltage derived from an overspeed summing amplifier 62. The summing amplifier 62 has an input, overspeed level, which is derived from a user adjustable control on the basic analog speed indicator unit. The user adjusts the overspeed level to a desired setting. The overspeed warning comparator 61 then provides an output to control logic 63 when the speed is within some predetermined range, say five miles per hour, lower than the overspeed limit the user has selected. Under these conditions, LED 49 flashes at a rate determined by square wave oscillator 64 to provide a warning that the selected overspeed limit is being approached. When an overspeed condition exists, the overspeed switch signal into control logic 63 turns LED 49 on continuously, there by overriding the flashing action of the square wave oscillator and signaling the overspeed condition to the operator. Simultaneously, in the basic speed indicator electronics (not shown), a control relay is energized when overspeed is reached. Note again that the actual drive current through this LED is controlled by the LM3914 LED driver 53 so that the brightness of LED 49 also tracks the overall display brightness.

The door retrofit speed indicator display operates on its own power supply which generates the necessary voltages directly from the locomotive 74 volt DC power. The +10 volt reference supply, which is critical to the overall accuracy of speed indicator display, is developed from the +15 volt supply using an inexpensive, yet high precision, integrated circuit device.

While the invention has been described in terms of two preferred embodiments, those skilled in the art will recognize that the invention can be practiced with modification within the spirit and scope of the appended claims.

Having thus described our invention, what we claim as new and desire to secure by Letters Patent is as follows:

1. A solid state speed indicator for use on railroad locomotives comprising:
   a display face;
   a first plurality of indicia arranged in an arc on said display face, said first plurality of indicia representing increments of speed;
   speed sensing means for controlling said first plurality of indicia to provide a display simulating an analog display of speed;
   a second plurality of indicia arranged on said display face in an arc of smaller radius but having a common center with the arc of said first plurality of indicia, said second plurality representing multiples of said increments of speed;
   a plurality of decimal numerals on said display face adjacent at least some of said indicia of the second plurality, said decimal numerals being in multiples of ten;
   an acceleration display on said display face providing an indication of acceleration or deceleration of said railroad locomotive;
   acceleration detecting means responsive to said speed sensing means for controlling said acceleration display;
   an overspeed indicator means on said display face providing a visual first indication of imminent overspeed conditions and a second indication of actual overspeed conditions;
   overspeed detecting means responsive to said speed sensing means for controlling said overspeed indicator;
   a planar LED for individually illuminating each of said decimal numerals; and
   range means for selectively controlling certain ones of said planar LEDs for selectively controlling the illumination of zeros in a units' position of said decimal numerals so as to provide said solid state speed indicator with two display ranges of speed.

2. The solid state speed indicator as recited in claim 1 further comprising:
   an odometer display providing an indication of distance traveled in feet; and
   distance computing means responsive to said speed sensing means for controlling said odometer display.

3. The solid state speed indicator as recited in claim 2 wherein said odometer display serves as said overspeed indicator for speeds above said predetermined level, said overspeed detecting means causing a flashing alpha display to appear on said odometer display as an indication of an imminent overspeed condition and a constant alpha display to appear as an indication of an actual overspeed condition.

4. The solid state speed indicator as recited in claim 1 wherein said overspeed indicator is in the form of a warning light, said overspeed detecting means causing said warning light to flash as an indication of an imminent overspeed condition and said warning light to be constantly on to appear as an indication of an actual overspeed condition.

5. The solid state speed indicator as recited in claim 1 wherein said first plurality of indicia, said second plurality of indicia, said plurality of decimal numerals, said acceleration display and said overspeed indicator are implemented with light emitting diodes, said solid state speed indicator further comprising a microcomputer responsive to said speed sensing means and generating control signals for controlling said light emitting diodes, said acceleration detecting means and said overspeed detecting means being implemented in a control program of said microcomputer.

6. The solid state speed indicator as recited in claim 1 wherein said first plurality of indicia, said second plurality of indicia, said plurality of decimal numerals, said acceleration display and said overspeed indicator are implemented with light emitting diodes, said solid state speed indicator further comprising:
   a plurality of light emitting diode driver integrated circuits, each of driver integrated circuits having an input for controlling the brightness of light emitting diodes connected to that driver integrated circuit;
- a plurality of current sinks each connected to a respective one of inputs of said driver integrated circuits; and
- a common brightness control means connected in parallel to said current sinks for simultaneously controlling the brightness of all said light emitting diodes.

7. The solid state speed indicator as recited in claim 6 wherein said current sinks are linearly-operated transistors having bases connected in parallel and said common brightness control means is a potentiometer for varying the base drive to said transistors.

8. The solid state speed indicator as recited in claim 6 wherein said current sinks are transistors having bases connected in parallel and said brightness control means switches said transistors on and off at a predetermined frequency and with a duty cycle that controls the brightness of said light emitting diodes.

9. The solid state speed indicator as recited in claim 6 wherein said first plurality of indicia are implemented with light emitting diodes, said solid state speed indicator further comprising:
- a plurality of light emitting diode driver integrated circuits, each of said driver integrated circuits having an internal voltage divider designed to control the turn-on threshold of each light emitting diode connected to that driver integrated circuit, said driver integrated circuit having a signal input connected to said internal voltage divider; and
- a low impedance, high precision resistive voltage divider having a plurality of taps across which said internal voltage divider of said driver integrated circuits are respectively connected, thereby ensuring high accuracy for the turn-on threshold for each light emitting diode in the arc of said first plurality of indicia.

10. A retrofit solid state speed indicator display for replacing meter movement displays on speed indicators used on railroad locomotives, said speed indicators having an equipment case housing electronic circuitry for driving said meter movement, said meter movement being mounted in a door serving as a closure for said equipment case, said retrofit display comprising:
- a display face mounted in a replacement door for the door in which said meter movement is mounted, said display face including a first plurality of indicia arranged in an arc, said first plurality of indicia representing increments of speed, a second plurality of indicia arranged in an arc of smaller radius but having a common center with the arc of said first plurality of indicia, said second plurality representing multiples of said increments of speed, a plurality of decimal numerals adjacent at least some of said indicia of the second plurality, said decimal numerals being in multiples of ten, an acceleration display providing an indication of acceleration or deceleration of said railroad locomotive, and an overspeed indicator providing a visual indication of both imminent and actual overspeed conditions; and
- a control circuit board attached to said replacement door responsive to a speed signal from said electronic circuitry in said case for controlling said first plurality of indicia to provide a display simulating an analog display of speed, said control circuit board further including acceleration detecting means responsive to said speed signal for controlling said acceleration display and overspeed detecting means responsive to said speed signal for controlling said overspeed indicator.

11. The solid state speed indicator as recited in claim 10 wherein said acceleration display is in the form of an upwardly pointing arrow and a downwardly pointing arrow providing an indication of acceleration and deceleration, respectively, and wherein said overspeed indicator is in the form of a warning light, said overspeed detecting means causing said warning light to flash as an indication of an imminent overspeed condition and said warning light to be constantly on to appear as an indication of an actual overspeed condition.

12. The solid state speed indicator as recited in claim 10 wherein said first plurality of indicia, said second plurality of indicia, said plurality of decimal numerals, said acceleration display and said overspeed indicator are implemented with light emitting diodes, said solid state speed indicator further comprising:
- a plurality of light emitting diode driver integrated circuits, each of driver integrated circuits having an input for controlling the brightness of light emitting diodes connected to that driver integrated circuit;
- a plurality of current sinks each connected to a respective one of inputs of said driver integrated circuits; and
- a common brightness control means connected in parallel to said current sinks for simultaneously controlling the brightness of all said light emitting diodes.

13. The solid state speed indicator as recited in claim 10 wherein said first plurality of indicia are implemented with light emitting diodes, said solid state speed indicator further comprising:
- a plurality of light emitting diode driver integrated circuits, each of said driver integrated circuits having an internal voltage divider designed to control the turn-on threshold of each light emitting diode connected to that driver integrated circuit, said driver integrated circuit having a signal input connected to said internal voltage divider; and
- a low impedance, high precision resistive voltage divider having a plurality of taps across which said internal voltage dividers of said driver integrated circuits are respectively connected, thereby ensuring high accuracy for the turn-on threshold for each light emitting diode in the arc of said first plurality of indicia.

14. A solid state speed indicator for use on railroad locomotives comprising:
- a display face;
- a first plurality of indicia arranged in an arc on said display face, said first plurality of indicia representing increments of speed;
- speed sensing means for controlling said first plurality of indicia to provide a display simulating an analog display of speed;
- a second plurality of indicia arranged on said display face in an arc of smaller radius but having a common center with the arc of said first plurality of indicia, said second plurality representing multiples of said increments of speed;
- a plurality of decimal numerals on said display face adjacent at least some of said indicia of the second plurality, said decimal numerals being in multiples of ten;

an acceleration display in the form of an upwardly pointing arrow and a downwardly pointing arrow providing an indication of acceleration and deceleration, respectively, acceleration detecting means responsive to said speed sensing means for controlling said acceleration display;

an overspeed indicator on said display face providing a visual indication of both imminent and actual overspeed conditions; and overspeed detecting means responsive to said speed sensing means for controlling said overspeed indicator.

15. A solid state speed indicator for use on railroad locomotives comprising:

a display face;

a first plurality of indicia arranged in an arc on said display face, said first plurality of indicia representing increments of speed;

speed sensing means for controlling said first plurality of indicia to provide a display simulating an analog display of speed;

a second plurality of indicia arranged on said display face in an arc of smaller radius but having a common center with the arc of said first plurality of indicia, said second plurality representing multiples of said increments of speed;

a plurality of decimal numerals on said display face adjacent at least some of said indicia of the second plurality, said decimal numerals being in multiples of ten;

an acceleration display on said display face providing an indication of acceleration or deceleration of said railroad locomotive;

acceleration detecting means responsive to said speed sensing means for controlling said acceleration display;

an overspeed indicator on said display face providing a visual indication of both imminent and actual overspeed conditions;

overspeed detecting means responsive to said speed sensing means for controlling said overspeed indicator; and said first plurality of indicia, said second plurality of indicia, said plurality of decimal numerals, said acceleration display and said overspeed indicator all implemented with light emitting diodes in said display face and said display face is mounted on an equipment case door, said door being substituted for a similar door carrying a meter movement display for an existing speed indicator device, thereby providing a retrofit solid state display having a higher reliability and accuracy than the meter movement display.

* * * * *